Patented Dec. 1, 1942

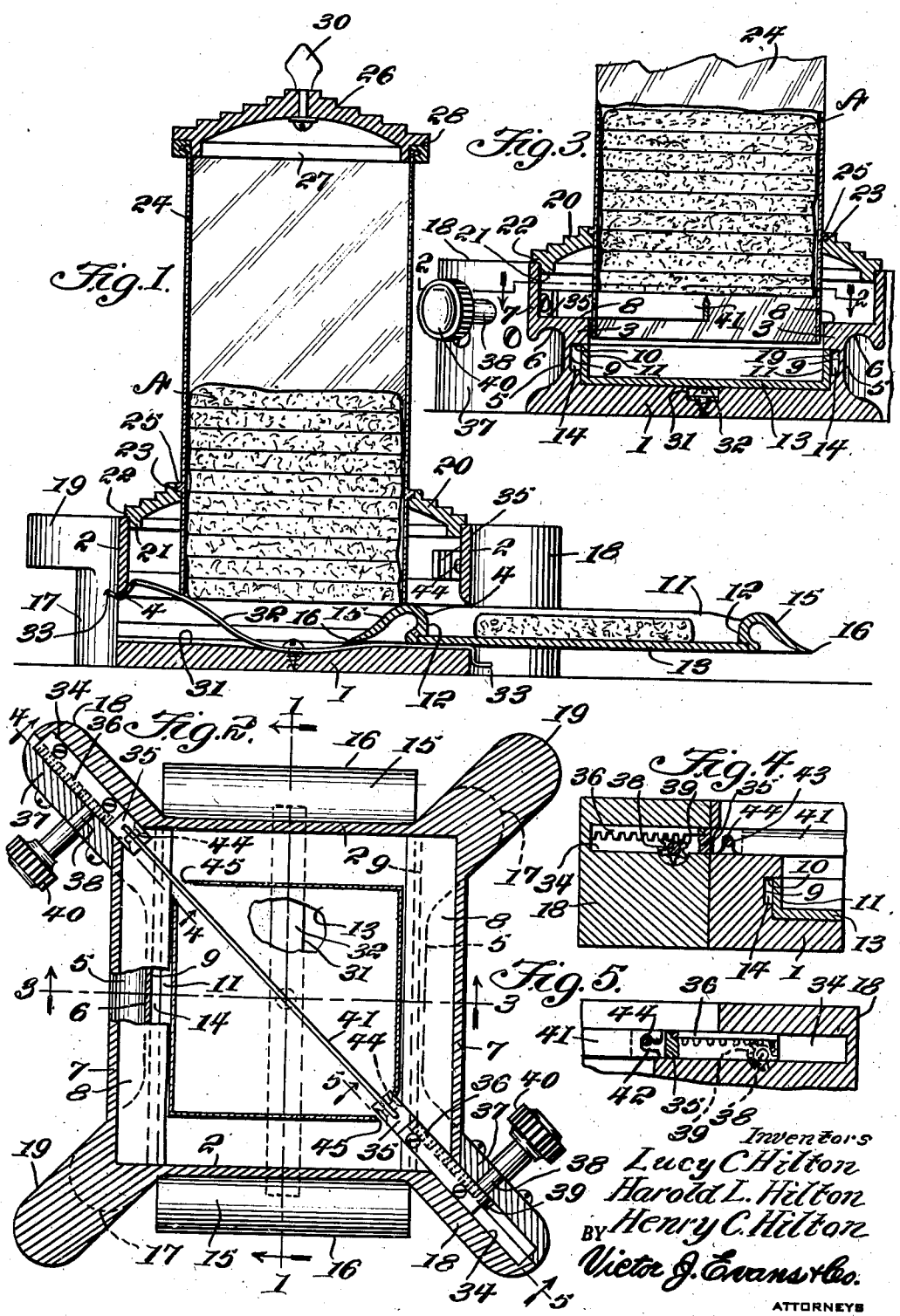

2,303,880

UNITED STATES PATENT OFFICE 2,303,880

DISPENSING DEVICE

Lucy C. Hilton, Newtown, Henry C. Hilton, Norwood, and Harold L. Hilton, Newtown, Ohio Application July 12, 1941, Serial No. 402,210

7 Claims. (Cl. 312—67)

This invention relates to dispensing devices, and its general object is to provide a device that is primarily designed for dispensing food products, particularly sliced bread or the like, a slice at a time, the slice being received in a tray which is removable from the device, to be served therein, thus it will be seen that the device is very desirable for use on a table during a meal, but of course it can be used at any time and place desired.

A further object is to provide a device that is capable of operation, for individually dispensing slices of bread, with minimum effort on the part of the user, and without possibility of damaging the slices.

Another object is to provide a dispensing device that includes a closed receptacle for receiving a presliced loaf of bread or the like, so that the loaf or unusued portion thereof is retained free from dust and foreign matter, and in a fresh condition until consumed.

A still further object is to provide a dispensing device that includes means for cutting the slices prior to being dispensed, and preferably diagonally of the slice, so that it is served in two triangular pieces to bring about convenience in eating the same whether individually or made up into sandwiches, and the cutting means can be readily applied and removed with respect to the device, for use therewith when desired.

A still further object is to provide a dispensing and cutting device of the character set forth, that is simple in construction, ornamental in appearance, light in weight, easy to handle, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a sectional view taken approximately on line 1—1 of Figure 2, looking in the direction of the arrows but with the cutting blade removed.

Figure 2 is a sectional view taken approximately on line 2—2 of Figure 3, looking in the direction of the arrows.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Figure 5 is a sectional view taken approximately on line 5—5 of Figure 2, looking in the direction of the arrows.

Referring to the drawing in detail, it will be noted that the base of the device includes a bottom wall 1, thin end walls 2 and side walls having relatively thick lower portions 3, the end walls being slotted as at 4, for the major portion of their length, at the juncture thereof with the bottom wall, and the thick lower portions of the side walls are exteriorly grooved as at 5, along their length, as best shown in Figure 3. The upper faces of the grooves are undercut to form finger receiving recesses 6, to facilitate lifting and carrying the device, as will be apparent, and the upper portions of the side walls are in the form of upright flanges 7 preferably of the same thickness as that of the end walls, as well as terminate at their upper edges flush with the upper edges of the end walls, while the upper faces 8 of the lower portions 3 are flat as likewise best shown in Figure 3.

The lower portions of the side walls are provided with interior grooves 9 throughout their length, to terminate flush with the ends of the slots 4, and the grooves 9 are of a shape to form upper portions or shoulders 10 that overlie the bottom wall 1 to provide guides for holding a tray slidably mounted on the bottom wall. The tray is in the form of a drawer and includes side walls 11, end walls 12 and a bottom wall 13, and the grooves 9 are disposed above the bottom wall as best shown in Figure 3 to provide spaces 14, so as to reduce friction on the side walls of the tray which is slidable through the slots 4 for disposal exteriorly of the base, as shown in Figure 1, and is entirely removable from the base to act as a server for the slices, as previously indicated. The end walls of the tray are formed with outwardly and downwardly curved flanges 15 extending from and throughout the length of the top of the end walls, and the flanges terminate in beveled outer edges 16. The flanges 15 not only provide handles to facilitate sliding the tray, through either of the slots 4, as well as for holding the tray when utilizing the same as a server when removed from the base, but the flanges also act for another purpose which will be later described.

Formed on and extending outwardly from the corners of the base are projections 17 and 18 that are coextensive with the height of the base and are provided with rounded outer portions. The projections 17 are formed to provide overhanging portions 19 that can be used as handles for lifting the device, as will be apparent, upon inspection of Figure 1, while the projections 18 are for another purpose, which will be later apparent.

Seated on the upper edge of the side and end walls of the base is a continuous square cornered frame 20, and for that purpose the frame is provided with a marginal rib 21 on its under face adjacent its outer edge to form a shoulder 22 that rests upon the edges of the base walls with the rib engaging the inner faces thereof, as clearly shown in Figure 1. The frame is inclined inwardly and upwardly from its outer edge and the upper face thereof is preferably stepped for ornamentation, while the inner edge portion of the frame is recessed to provide a shoulder 23.

The body 24 of the receptacle for housing the food products, such as for example a loaf of sliced bread or the like A, is of upright rectangular formation to conform to the general configuration of the loaf to substantially fit the same, and the body is preferably made from any suitable transparent material, such as glass, Celluloid or the like. The body is of a height to accommodate loaves of products of any length and formed on or otherwise secured to and about the outer face of the body adjacent to its lower edge is a bead 25 that rests upon the shoulder 23 for supporting the body relative to the base. The bead is disposed at a height above the lower edge of the body so that the lower edge will be spaced from, but in close proximity to the bottom wall 1, as best shown in Figure 1.

The top and bottom of the body are both open and the top is provided with a removable closure 26 in the form of a lid that is formed with a depending rib 27 providing a shoulder 28, the latter being adapted to rest upon a continuous frame 29 that is fixed to the outer face of the body at its upper end, while the rib 27 engages the inner face of the body to hold the lid in place. The closure or lid is shown as being upwardly inclined toward its center and fixed centrally to the lid is a knob 30. The upper face of the lid is preferably stepped for the purpose of ornamentation.

The bottom wall 1 is provided with a groove 31 along its longitudinal center to provide a seat for a normally upwardly bowed leaf spring 32 for disposal of the spring flush with or below the upper face of the bottom wall when depressed by the tray, the groove having a relatively deep central portion within which the spring is fixed midway its ends by a screw. The spring is of a length to extend beyond the ends of the bottom wall and the ends of the spring are bent downwardly and outwardly in right angle formation to provide ears 33 that bear against the upper edges of the slots 4, with the ears extending outwardly beyond the side walls 2, when the spring is released, upon removal of the tray from the base, as clearly shown in Figure 1. By that construction, it will be obvious that when it is desired to replace the tray from a fully removed position from the device, the beveled outer edge 16 of the flanges 15 can be engaged with either of the ears 33 for depressing the spring and thus allow the replacement of the tray, as will be apparent.

The normal bowed position of the spring 32, is such, that it bears against the lower edge of the body 24 of the receptacle, as shown in Figure 1, so as to hold the lowermost slice of the loaf A elevated, to allow replacement of the tray without damaging that slice. Damage to the said slice is likewise eliminated, due to the shape of the flanges 15, as the beveled edges 16 which are parallel with the bottom wall of the tray will underlie the lowermost slice when the tray is replaced and thus elevate the same, due to the cammed action against the slice, which is brought about by the curvature of the flanges 15, as will be apparent upon inspection of Figure 1.

The projections 18 are provided with horizontally disposed square cornered bores 34 adjacent the upper ends thereof and which open into the space between the walls of the base, while the outer ends of the bores terminate in close proximity to the outer ends of the projection 18. Mounted for slidable movement in the bores are blocks 35 of a length to project through the bores and secured to and countersunk in the upper faces of the blocks 35 are racks 36 having depending teeth disposed laterally of one side of the blocks. Mounted for rotation in removable sections 37 of the projections 18 are stub shafts 38 having pinions 39 fixed to the inner ends thereof and meshing with the rack teeth for sliding the blocks in a reciprocatory manner, as will be apparent. Removably secured to the outer projecting ends of the stud shafts 38 are knobs 40.

It will be obvious that the structure just described includes parts of the cutting means which also includes a blade 41 that is removably connected to the blocks or slides 35, and for that purpose the confronting end portions of the blocks are kerfed for receiving the end portions of the blade. One end portion of the blade is provided with a bayonet slot 42, while its opposite end portion has a straight slot 43 therein, the slots being clearly shown in Figures 4 and 5, and bridging the kerfs of the blocks 35 are pins 44 to be received in the slots.

In applying the blade to the pins 44, the bayonet slotted end is first inserted on either of the pins, and thence the other slotted end of the blade is inserted on the other pin, thus it will be seen that the blade can be easily applied and removed with respect to the blocks to be reciprocated thereby diagonally of the base for cutting the slices of products accordingly, but casual removal or displacement of the blade is practically impossible.

The body of the receptacle has its lower end notched as at 45 to provide passageways for the blade, so as to allow the body to be disposed a considerable distance below the blade, as clearly shown in Figure 3.

From the above description and disclosure in the drawing, it is believed that the use of the device will be obvious, but it might be mentioned that a loaf of presliced food products such as the loaf of bread A is inserted within the body of the receptacle, so that the slices will feed by gravity into the tray. When it is desired to dispense a slice the tray is pulled outwardly through either of the slots 4, and partial outward movement of the tray will release one end portion of the spring and cause the same to contact the slice next above the dispensed slice, to hold the former elevated and out of the way, so as to allow replacement of the tray, without damaging the slices, as previously indicated. However, when the blade 41 is in place, it will hold the slices elevated above the tray, but of course the device can be used with or without the blade.

When it is desired to use the blade, it is applied to the pins 44 and the lowermost slice will rest upon the cutting edges thereof, with the blade disposed diagonally of the slice, which is cut accordingly, upon rotation of either of the knobs 40, to bring about reciprocation of the blade.

While it has been stated that the device is primarily designed for dispensing food products and particularly sliced bread, it will be obvious that it can be used for dispensing any kind of flat or substantially flat articles that can be stacked one upon the other within the receptacle body.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A dispensing device comprising a hollow base including a bottom wall, an upright receptacle associated with the base and for housing articles stacked therein one upon the other to be fed by gravity to the base, a dispensing tray mounted for slidable movement on the bottom wall and through the base and normally underlying the receptacle for individually receiving the articles therefrom, a bowed leaf spring fixed midway its ends to the bottom wall and extending upwardly therefrom for normal engagement with the lowermost article to hold the same within the receptacle when the tray is in dispensing position, and cammed handle means secured to the tray for engagement with said article and the spring to release the latter from said article when the tray is moved to normal position.

2. A dispensing device comprising a hollow base having opposed slots therein and including a bottom wall, an upright receptacle having open ends, a removable closure for the upper end, means supporting the receptacle relative to the base with its lower end spaced from the bottom wall, said receptacle adapted to house articles stacked therein one upon the other to be fed by gravity to the base, a dispensing tray normally underlying the receptacle for individually receiving the articles therefrom and mounted for slidable movement on the bottom wall and through either of the slots, a bowed leaf spring fixed midway its ends to and centrally of the bottom wall and extending upwardly therefrom for normal engagement with the lowermost article to hold the same within the receptacle when the tray is in dispensing position, said tray being removable from the base, ears formed on the outer ends of the spring and normally engaged with the upper edges of the slots, and means on the tray for engagement with the ears and certain portions of the body of the spring to release the latter from said article when the tray is moved to normal position.

3. A dispensing device comprising a hollow base having opposed slots therein and including a bottom wall, an upright receptacle having open ends, a removable closure for the upper end, means supporting the receptacle relative to the base with its lower end spaced from the bottom wall, said receptacle adapted to house articles stacked therein one upon the other to be fed by gravity to the base, a dispensing tray normally underlying the receptacle for individually receiving the articles therefrom and mounted for slidable movement on the bottom wall and through either of the slots, a bowed leaf spring fixed midway its ends to and centrally of the bottom wall and extending upwardly therefrom for normal engagement with the lowermost article to hold the same within the receptacle when the tray is in dispensing position, said tray being removable from the base, ears formed on the outer ends of the spring and normally engaged with the upper edges of the slots, means on the tray for engagement with the ears and certain portions of the body of the spring to release the latter from said article when the tray is moved to normal position, and the releasing means providing handles for the tray and being curved to set up a cammed action against said article to elevate the same out of the path of the tray when the latter is moved to normal position.

4. A dispensing device comprising a hollow base including bottom, side and end walls, said side walls having exterior undercut grooves therein providing handles for the device, said end walls having slots therein along the length thereof, a supporting frame mounted on the upper edges of the side and end walls, an upright receptacle including a transparent rectangular body having open ends, a bead secured to and surrounding said body adjacent its lower end and mounted on the frame for the latter to support said body with its lower end spaced from the bottom wall, a closure for the upper end of the body and resting thereon, said body adapted to house articles stacked therein one upon the other to be fed by gravity to the base, a dispensing tray normally underlying the receptacle for individually receiving the articles therein and mounted for slidable movement on the bottom wall and through either of the slots, said tray normally underlying the receptacle for receiving the articles therefrom, resilient means secured to the bottom wall and normally engageable with the lowermost article to hold the same within the receptacle when the tray is in dispensing position, and means on said tray for engagement with the resilient means to release the same from said article when the tray is moved to normal position.

5. In a dispensing device, a hollow base provided with dispensing slots, an upright receptacle associated with the base and for housing a presliced loaf of bread or the like for the slices to be fed by gravity to the base for passage through the slots, means for cutting the slices into separate portions prior to being dispensed through the slots and including a blade arranged in the path of the slices, blocks mounted for reciprocation in the base, means for detachably connecting the ends of the blade to the blocks, and means for reciprocating the blocks.

6. In a dispensing device, a hollow base provider with dispensing slots, an upright receptacle associated with the base for housing a presliced loaf of bread or the like for the slices to be fed by gravity to the base for passage through the slots, means for cutting the slices into separate portions prior to being dispensed through the slots and including a blade arranged in the path of the slices, oppositely directed projections secured to the base and certain of the projections having bores therein opening into the base, blocks mounted for reciprocation in the bores and having kerfed confronting ends, pins secured to the blocks and bridging the kerfs thereof, said blade being slotted adjacent to its ends to receive the pins for detachably securing the blade to the blocks in bridging relation thereto, and means for reciprocating said blocks.

7. In a dispensing device, a hollow base provided with dispensing slots, an upright receptacle associated with the base for housing a pre-sliced loaf of bread or the like for the slices to be fed by gravity to the base for passage through the slots, means for cutting the slices into separate portions prior to being dispensed through the slots and including a blade arranged in the path of the slices, oppositely directed projections secured to the base and certain of the projections having bores therein opening into the base, blocks mounted for reciprocation in the bores and having kerfed confronting ends, pins secured to the blocks and bridging the kerfs thereof, said blade being slotted adjacent to its ends to receive the pins for detachably securing the blade to the blocks in bridging relation thereto, racks secured to the blocks, shafts rotatably mounted in the bored projections, pinions fixed to the shafts and meshing with the racks for reciprocating the blades, and knobs providing handles and secured to the shafts.

LUCY C. HILTON.
HENRY C. HILTON.
HAROLD L. HILTON.